United States Patent
Yamashita et al.

(10) Patent No.: US 6,956,076 B2
(45) Date of Patent: Oct. 18, 2005

(54) INORGANIC PARTICLE-CONTAINING COMPOSITION, TRANSFER FILM COMPRISING THE SAME AND PLASMA DISPLAY PANEL PRODUCTION PROCESS

(75) Inventors: Takanori Yamashita, Mie (JP); Kenji Okamoto, Mie (JP); Jiro Takahashi, Mie (JP); Tadahiko Udagawa, Kanagawa (JP)

(73) Assignee: JSR Corporation, Tokyo (JP)

( * ) Notice: Subject to any disclaimer, the term of this patent is extended or adjusted under 35 U.S.C. 154(b) by 532 days.

(21) Appl. No.: 09/988,305

(22) Filed: Nov. 19, 2001

(65) Prior Publication Data

US 2002/0035183 A1 Mar. 21, 2002

Related U.S. Application Data

(62) Division of application No. 09/409,074, filed on Sep. 30, 1999, now Pat. No. 6,339,118.

(30) Foreign Application Priority Data

Oct. 1, 1998 (JP) .......................... 10-280294

(51) Int. Cl.$^7$ .............................. C08K 5/10
(52) U.S. Cl. ................ 524/308; 313/582; 428/206; 428/210; 428/332; 428/335; 430/315; 427/304; 445/24
(58) Field of Search ................ 524/308; 313/582; 427/304; 428/206, 210, 332, 335; 430/315; 445/24

(56) References Cited

U.S. PATENT DOCUMENTS

| 3,971,744 A | 7/1976 | Hudecek et al. |
| 4,129,489 A | 12/1978 | Christenson et al. |
| 5,133,974 A | 7/1992 | Paradissis et al. |
| 5,188,693 A | 2/1993 | Nagata et al. |
| 5,792,589 A | 8/1998 | Udagawa et al. |
| 5,866,312 A | 2/1999 | Wang et al. |
| 5,900,146 A | 5/1999 | Ballard et al. |
| 5,929,133 A | 7/1999 | Watanabe et al. |
| 5,980,347 A | 11/1999 | Udagawa et al. |
| 6,337,028 B1 | 1/2002 | Masuko et al. |

FOREIGN PATENT DOCUMENTS

| JP | A-5-205627 | 8/1993 |
| JP | A-5-205632 | 8/1993 |
| JP | A-5-205633 | 8/1993 |
| JP | A-6-75372 | 3/1994 |
| JP | A-6-321619 | 11/1994 |
| JP | A-7-176269 | 7/1995 |
| JP | A-9-102273 | 4/1997 |
| JP | A-9-142878 | 6/1997 |
| JP | A-10-291834 | 11/1998 |
| JP | A-11-162339 | 6/1999 |

*Primary Examiner*—Edward J. Cain
(74) *Attorney, Agent, or Firm*—Oblon, Spivak, McClelland, Maier & Neustadt, P.C.

(57) ABSTRACT

An inorganic particle-containing composition comprising:
(A) inorganic particles;
(B) a binder resin; and
(C) at least one plasticizer selected from the group consisting of compounds represented by the following formula (1):

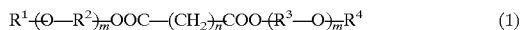

(1)

wherein $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10,
and compounds represented by the following formula (2):

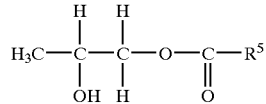

(2)

wherein $R^5$ is an alkyl group having 1 to 30 carbon atoms or alkenyl group.

A transfer film and a plasma display panel production process using the composition are also described.

7 Claims, 3 Drawing Sheets

(a)

transfer film

X (b)

F2 (film forming material layer)
F3 (cover film)
F1 (base film)

details of X portion

MA: light transmitting portion
MB: light shielding portion
M: exposure mask

INORGANIC PARTICLE-CONTAINING COMPOSITION, TRANSFER FILM COMPRISING THE SAME AND PLASMA DISPLAY PANEL PRODUCTION PROCESS

This application is a Divisional of U.S. application Ser. No. 09/409,074, filed on Sep. 30, 1999, now U.S. Pat. No. 6,339,118.

DETAILED DESCRIPTION OF THE INVENTION

The present invention relates to an inorganic particle-containing composition, a transfer film comprising the same and a plasma display panel production process.

In recent years, much attention has been paid to a plasma display as a plate-like fluorescent display. FIG. 1 is a diagram typically showing the section of an AC plasma display panel (to be abbreviated as "PDP"hereinafter). In FIG. 1, reference numerals 1 and 2 denote glass substrates which are opposed to each other, and 3 a barrier. Cells are formed by the glass substrate 1, the glass substrate 2 and the barrier 3. Denoted by 4 is a transparent electrode fixed on the glass substrate 1, 5 a bus electrode formed on the transparent electrode 4 to reduce the resistance of the transparent electrode 4, 6 an address electrode fixed on the glass substrate 2, 7 a fluorescent material held in each cell, 8 a dielectric layer formed on the surface of the glass substrate 1 to cover the transparent electrode 4 and the bus electrode 5, 9 a dielectric layer formed on the surface of the glass substrate 2 to cover the address electrode 6, and P a protective film made from magnesium oxide, for example.

A color filter (red, green or blue) or a black matrix may be formed between the glass substrate and the dielectric layer to obtain a high-contract image in a color PDP.

There is known a method of forming the dielectric layer 8 which comprises preparing a pasty inorganic particle-containing composition (glass paste composition) containing glass powders, a binder resin and a solvent, coating the glass paste composition on the surface of the glass substrate 1 by a screen printing method, drying it to form a film forming material layer, and baking this film forming material layer to remove the organic substances and sinter the glass powders.

As the binder resin forming the glass paste composition, there are known cellulose derivatives such as methyl cellulose, ethyl cellulose and carboxymethyl cellulose, polyvinyl alcohol's, polyvinyl butyral, urethane-based resins and melamine-based resins. Out of these, ethyl cellulose is preferred from the viewpoints of the dispersibility of glass powders, the coating properties of the composition and flammability (refer to JP-A 6-321619) (the term "JP-A" as used herein means an "unexamined published Japanese patent application").

The thickness of the film forming material layer formed on the glass substrate 1 must be 1.3 to 2.0 times the thickness of the dielectric layer 8 to be formed in consideration of a reduction in the thickness of the film caused by the removal of the organic substances in the baking step. For example, to adjust the thickness of the dielectric layer 8 to 20 to 50 $\mu$m, a film forming material layer having a thickness of 30 to 100 $\mu$m must be formed.

When the glass paste composition is coated by a screen printing method, the thickness of the coating film formed by a single time of coating is about 15 to 25 $\mu$m. Therefore, to form the film forming material layer having a predetermined thickness, the glass paste composition must be coated on the surface of the glass substrate a plurality of times, for example, 2 to 7 times (multiple printing).

However, when the film forming material layer is formed by multiple printing making use of the screen printing method, the dielectric layer formed by baking the film forming material layer does not have uniform thickness (for example, a tolerance of ±5% or less). This is because it is difficult to coat the glass paste composition uniformly on the surface of the glass substrate by multiple printing making use of the screen printing method. As the coating area (panel size) and the number of times of coating increase, nonuniformity in the thickness of the dielectric layer becomes larger. A panel material (glass substrate having the dielectric layer) obtained by the step of coating by multiple printing has nonuniform dielectric characteristics caused by thickness nonuniformity within the plane and nonuniform dielectric characteristics cause surface defects (brightness nonuniformity) in a PDP.

Further, the mesh form of a screen plate may be transferred to the surface of the film forming material layer in the screen printing method and a dielectric layer formed by baking this film forming material layer is inferior in surface flatness.

As means of solving the above problems when the film forming material layer is formed by the screen printing method, the inventors of the present invention have proposed a PDP production process comprising the steps of coating a glass paste composition on the surface of a base film, drying the coating film to form a film forming material layer, transferring the film forming material layer formed on the base film to the surface of a glass substrate having electrodes fixed thereon and baking the transferred film forming material layer to form a dielectric layer on the surface of the glass substrate (may be referred to as "dry film method" hereinafter)(refer to JP-A 9-102273).

According to this production process, a dielectric layer having excellent thickness uniformity and surface uniformity can be formed.

The present inventors have also proposed a composite film comprising a base film, a film forming material layer obtained from a glass paste composition and a cover film which is formed on the surface of the film forming material layer and can be peeled off easily as a transfer film which can be suitably used for the formation of the dielectric layer of a PDP (refer to JP-A 9-101653).

This composite film (transfer film) is advantageous because it can be kept in the form of a roll.

The present inventors have further proposed a method of forming a barrier, electrode, resistor, dielectric layer, phosphor, color filter and black matrix which are the constituent elements of a PDP, which comprises the steps of coating a pasty inorganic particle-containing composition on the surface of a base film to form a film forming material layer (transfer film), transferring the film forming material layer formed on the base film to the surface of a substrate, forming a resist film on the transferred film forming material layer, exposing the resist film to form a resist pattern latent image, developing the resist film to form a resist pattern, etching the film forming material layer to form a pattern layer corresponding to the resist pattern and baking the pattern layer (refer to JP-A 9-340514).

However, when the film forming material layer is formed by coating a glass paste composition (inorganic particle-containing composition) containing a conventionally known resin such as a cellulose derivative on the surface of a base film (a transfer film is produced), the formed film forming material layer is not so flexible that the surface of the film forming material layer is finely cracked if the transfer film is bent.

A transfer film comprising a film forming material layer with unsatisfactory flexibility is inferior in suppleness and is difficult to be rolled.

Since the film forming material layer containing a cellulose derivative cannot exhibit sufficient adhesion (thermal adhesion) to the glass substrate, it is difficult to transfer the layer from the base film to the surface of the glass substrate.

To cope with these problems, the present inventors have found that a transfer film having excellent transferability of the film forming material layer (adhesion to the glass substrate) can be obtained by preparing a glass paste composition containing an acrylic resin as a binder resin and coating the glass paste composition on the surface of a base film.

However, the film forming material layer formed by coating the glass paste composition containing an acrylic resin on the surface of the base film still does not have sufficient flexibility.

As means of providing flexibility to the film forming material layer constituting a transfer film, there is conceivable a method of forming a film forming material layer by preparing a glass paste composition containing an acrylic resin having high flexibility and coating the glass paste composition on the surface of a base film.

However, the acrylic resin having high flexibility may not be completely decomposed and removed in the step of baking the film forming material layer and part of the acrylic resin may remain in the formed sintered body (for example, a dielectric layer composed of a glass sintered body) and color the dielectric layer, thereby impairing its light transmission properties.

The present invention has been made under the above circumstances.

It is a first object of the present invention to provide an inorganic particle-containing composition capable of forming a constituent element (for example, a barrier, electrode, resistor, dielectric layer, phosphor, color filter or black matrix) of a PDP advantageously.

It is a second object of the present invention to provide an inorganic particle-containing composition capable of forming a glass sintered body (for example, a dielectric layer constituting a PDP) having high light transmittance.

It is a third object of the present invention to provide an inorganic particle-containing composition capable of producing a transfer film comprising a film forming material layer having excellent flexibility.

It is a fourth object of the present invention to provide an inorganic particle-containing composition capable of producing a transfer film having excellent transferability, that is, heat adhesion of a film forming material layer to a substrate.

It is a fifth object of the present invention to provide a transfer film capable of forming a constituent element of a PDP efficiently.

It is a sixth object of the present invention to provide a transfer film comprising a film forming material layer having excellent flexibility.

It is a seventh object of the present invention to provide a transfer film having excellent transferability (heat adhesion to a substrate) of a film forming material layer.

It is an eighth object of the present invention to provide a PDP production process capable of forming a constituent element of a PDP efficiently.

It is a ninth object of the present invention to provide a PDP production process capable of forming a PDP having the high position accuracy of a constituent element.

It is a tenth object of the present invention to provide a PDP production process capable of forming a dielectric layer having large thickness efficiently.

It is an eleventh object of the present invention to provide a PDP production process capable of forming a dielectric layer required for a large panel efficiently.

It is a twelfth object of the present invention to provide a process for producing a PDP having a dielectric layer with excellent thickness uniformity.

It is a thirteenth object of the present invention to provide a process for producing a PDP having a dielectric layer with excellent surface flatness.

Other objects and advantages of the present invention will become apparent from the following description.

According to the present invention, firstly, the above objects and advantages of the present invention are attained by an inorganic particle-containing composition comprising:

(A) inorganic particles;

(B) a binder resin; and (C) at least one plasticizer selected from the group consisting of compounds represented by the following formula (1):

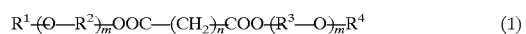

wherein $R^1$ and $R^4$ are the same or different alkyl groups having 1 to 30 carbon atoms or alkenyl groups, $R^4$ and $R^3$ are the same or different alkylene groups having 1 to 30 carbon atoms or alkenylene groups, m is an integer of 0 to 5, and n is an integer of 1 to 10, and compounds represented by the following formula (2):

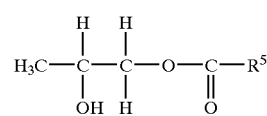

wherein $R^5$ is an alkyl group having 1 to 30 carbon atoms or alkenyl group.

Secondly, the above objects and advantages of the present invention are attained by a transfer film comprising a film forming material layer formed of the above inorganic particle-containing composition.

Thirdly, the above objects and advantages of the present invention are attained by a PDP production process which comprises the steps of transferring a film forming material layer constituting the above transfer film to the surface of a substrate and baking the transferred film forming material layer to form a dielectric layer on the substrate.

Fourthly, the above objects and advantages of the present invention are attained by a PDP production process which comprises the steps of transferring a film forming material layer formed of the above inorganic particle-containing composition to the surface of a substrate, forming a resist film on the transferred film forming material layer, exposing the resist film to form a resist pattern latent image, developing the resist film to form a resist pattern, etching the film forming material layer to form a pattern layer corresponding to the resist pattern, and baking the pattern layer to form a constituent element selected from the group consisting of a barrier, electrode, resistor, dielectric layer, phosphor, color filter and black matrix.

Fifthly, the above objects and advantages of the present invention are attained by a PDP production process which comprises the steps of forming a laminate film consisting of a resist film and a film forming material layer formed of the above inorganic particle-containing composition on a base film in the order named, transferring the laminate film formed on the base film to the surface of a substrate, exposing the resist film constituting the laminate film to form a resist pattern latent image, developing the resist film to form a resist pattern, etching the film forming material layer to form a pattern layer corresponding to the resist pattern, and baking the pattern layer to form a constituent element selected from the group consisting of a barrier, electrode, resistor, dielectric layer, phosphor, color filter and black matrix.

Figure 1:
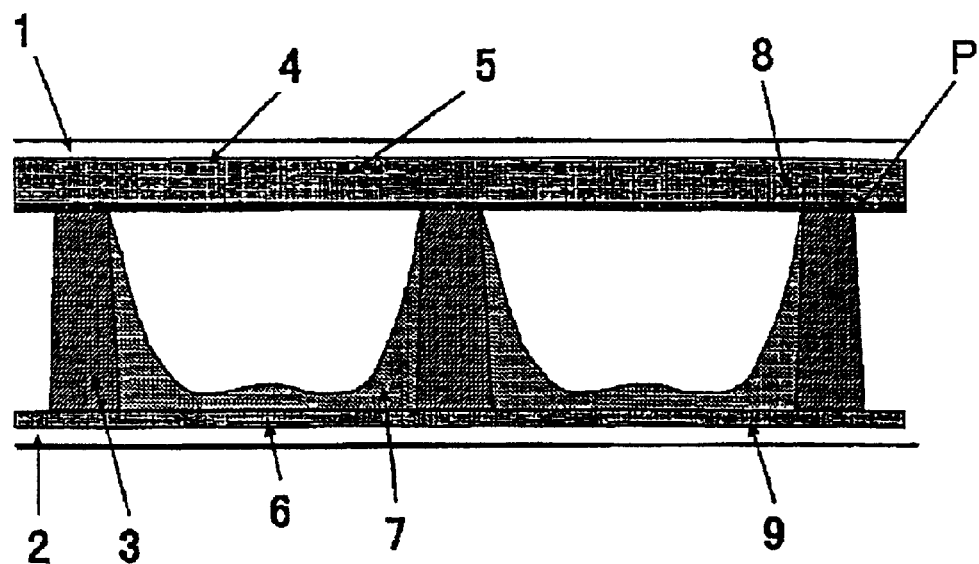
FIG. 1 is a diagram typically showing the section of an AC plasma display panel.

The inorganic particle-containing composition of the present invention will be described in detail hereinunder.

The composition of the present invention comprises inorganic particles, a binder resin and a plasticizer represented by a specific structural formula as essential ingredients.

<Inorganic Particles>

An inorganic material forming the inorganic particles constituting the composition of the present invention is not particularly limited and an appropriate inorganic material is selected according to the application purpose of a sintered body formed of the composition (type of constituent element of a PDP).

The inorganic particles contained in the composition for forming a "dielectric layer" or "barrier" constituting a PDP are, for example, glass powders having a softening point of 400 to 600° C.

When the softening point of the glass powders is lower than 400° C., part of organic substances such as a binder resin remain in the formed dielectric layer because glass powders are molten when the organic substances are not completely decomposed and removed in the step of baking the film forming material layer of the above composition, whereby the dielectric layer is apt to be colored and its light transmittance tends to lower. When the softening point of the glass powders is higher than 600° C., a glass substrate is readily distorted because the glass powders must be baked at a temperature higher than 600° C.

Preferred examples of the glass powders include (1) a mixture of lead oxide, boron oxide and silicon oxide ($PbO$—$B_2O_3$—$SiO_2$), (2) a mixture of zinc oxide, boron oxide and silicon oxide ($ZnO$—$B_2O_3$—$SiO_2$), (3) a mixture of lead oxide, boron oxide, silicon oxide and aluminum oxide ($PbO$—$B_2O_3$—$SiO_2$—$Al_2O_3$), and (4) a mixture of lead oxide, zinc oxide, boron oxide and silicon oxide ($PbO$—$ZnO$—$B_2O_3$—$SiO_2$), and the like.

These glass powders may be contained in the composition for forming a constituent element (for example, an electrode, resistor, phosphor, color filter or black matrix) other than the dielectric layer and the barrier.

The inorganic particles contained in a composition for forming an "electrode" constituting a PDP are preferably Ag, Au, Al, Ni, Ag—Pd alloy, Cu or Cr particles.

The inorganic particles contained in a composition for forming a "resistor" constituting a PDP are $RuO_2$ particles or the like.

The inorganic particles contained in a composition for forming a "phosphor" constituting a PDP are a red fluorescent material such as $Y_2O_3$:$Eu^{3+}$, $Y_2SiO_5$:$Eu^{3+}$, $Y_3Al_5O_{12}$:$Eu^{3+}$, $YVO_4$:$EU^{3+}$, (Y, Gd) $BO_3$: $Eu^{3+}$ or $Zn_3(PO_4)_2$:Mn; green fluorescent material such as $Zn_2SiO_4$:Mn, $BaAl_{12}O_{19}$:Mn, $BaMgAl_{14}O_{23}$:Mn, $LaPO_4$:(Ce,Tb) or $Y_3(Al,Ga)_5O_{12}$:Tb; or blue fluorescent material such as $Y_2SiO_5$: Ce, $BaMgAl_{10}O_{17}$:$Eu^{2+}$, $BaMgAl_{14}O_{23}$:$Eu^{2+}$, (Ca, Sr,Ba)$_{10}$(PO$_4$)$_6$Cl$_2$:$Eu^{2+}$ or (Zn,Cd)S:Ag.

The inorganic particles contained in a composition for forming a "color filter" constituting a PDP are a red material such as $Fe_2O_3$ or $Pb_3O_4$, green material such as $Cr_2O_3$, or blue material such as $2(Al_2Na_2Si_3O_{10})$ $Na_2S_4$.

The inorganic particles contained in a composition for forming a "black matrix" constituting a PDP are Mn, Fe or Cr particles.

<Binder Resin>

The binder resin constituting the composition of the present invention is preferably an acrylic resin. Since the composition contains an acrylic resin as the binder resin, the formed film forming material layer exhibits excellent (heat) adhesion to a substrate. Therefore, when the composition of the present invention is coated on the surface of a base film to form a transfer film, the obtained transfer film has excellent transferability, that is, heat adhesion of the film forming material layer to the substrate.

As the acrylic resin constituting the composition of the present invention is used a (co)polymer which has appropriate tackiness, can bind inorganic particles and is completely oxidized and removed by the baking of the film forming material (at 400 to 600° C.).

The acrylic resin preferably contains a polymer unit derived from a (meth)acrylate compound represented by the following general formula (3):

(3)

wherein $R^6$ is a hydrogen atom or methyl group, and $R^7$ is a monovalent organic group.

The acrylic resin is, for example, a homopolymer of a (meth)acrylate compound represented by the above formula (3), a copolymer of two or more (meth)acrylate compounds represented by the above formula (3) or a copolymer of a (meth)acrylate compound represented by the above formula (3) and other copolymerizable monomer.

Illustrative examples of the (meth)acrylate compound represented by the above formula (3) include alkyl (meth)acrylates such as methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pentyl (meth)acrylate, amyl (meth)acrylate, isoamyl (meth)acrylate, hexyl (meth)acrylate, heptyl (meth)acrylate, octyl (meth)acrylate, isooctyl (meth)acrylate, ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate and isostearyl (meth)acrylate; hydroxyalkyl (meth)

acrylates such as hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate; phenoxyalkyl (meth)acrylates such as phenoxyethyl (meth)acrylate and 2-hydroxy-3-phenoxypropyl (meth)acrylate; alkoxyalkyl (meth)acrylates such as 2-methoxyethyl (meth)acrylate, 2-ethoxyethyl (meth)acrylate, 2-propoxyethyl (meth)acrylate, 2-butoxyethyl (meth)acrylate and 2-methoxybutyl (meth)acrylate; polyalkylene glycol (meth)acrylates such as polyethylene glycol mono(meth)acrylate, ethoxydiethylene glycol (meth)acrylate, methoxypolyethylene glycol (meth)acrylate, phenoxypolyethylene glycol (meth)acrylate, nonyl phenoxypolyethylene glycol (meth)acrylate, polypropylene glycol mono(meth)acrylate, methoxypolypropylene glycol (meth)acrylate, ethoxypolypropylene glycol (meth)acrylate and nonyl phenoxypolypropylene glycol (meth)acrylate; cycloalkyl (meth)acrylates such as cyclohexyl (meth)acrylate, 4-butylcyclohexyl (meth)acrylate, dicyclopentanyl (meth)acrylate, dicyclopentenyl (meth)acrylate, dicyclopentadienyl (meth)acrylate, bornyl (meth)acrylate, isobornyl (meth)acrylate and tricyclodecanyl (meth)acrylate; benzyl (meth)acrylate, tetrahydrofurfuryl (meth)acrylate and the like.

Out of these, (meth)acrylate compounds of the formula (3) in which the group represented by $R^7$ contains an alkyl group or oxyalkylene group are preferred. Particularly preferred (meth)acrylate compounds are butyl (meth)acrylate, ethylhexyl (meth)acrylate, lauryl (meth)acrylate, isodecyl (meth)acrylate and 2-ethoxyethyl (meth)acrylate. The other copolymerizable monomer is not particularly limited if it can be copolymerized with the above (meth)acrylate compounds, as exemplified by unsaturated carboxylic acids such as (meth)acrylic acid, vinylbenzoic acid, maleic acid and vinylphthalic acid; and vinyl group-containing radical polymerizable compounds such as vinylbenzyl methyl ether, vinyl glycidyl ether, styrene, a-methylstyrene, butadiene and isoprene. The proportion of the polymer unit derived from the (meth)acrylate compound represented by the above formula (3) in the acrylic resin constituting the composition of the present invention is preferably 70 wt % or more, more preferably 90 wt % or more.

Preferred examples of the acrylic resin include polymethyl methacrylate, polybutyl methacrylate, methyl methacrylate-butyl methacrylate copolymer and the like.

When the film forming material needs to be alkali-soluble to be etched for the formation of a constituent element of a PDP using a photoresist method which will be described hereinafter, an unsaturated carboxylic acid is preferably used as at least part of the above other copolymerizable monomer (comonomer).

The weight average molecular weight in terms of styrene measured by GPC (to be simply referred to as "weight average molecular weight" hereinafter) of the acrylic resin constituting the composition of the present invention is preferably 4,000 to 300,000, more preferably 10,000 to 200,000.

The proportion of the binder resin in the composition of the present invention is preferably 5 to 80 parts by weight, more preferably 10 to 50 parts by weight based on 100 parts by weight of the inorganic particles. When the proportion of the binder resin is too small, the binder resin cannot bind and hold the inorganic particles firmly and when the proportion is too large, the baking step may take long or the formed sintered body (for example, a dielectric layer) may not have sufficient strength or thickness.

<Plasticizer>

The composition of the present invention is characterized in that it contains a plasticizer (to be referred to as "specific plasticizer" hereinafter) which is a compound represented by the following formula (1):

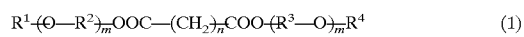

wherein $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10, or the following formula (2):

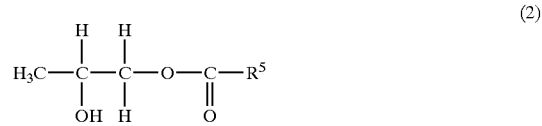

wherein $R^5$ is an alkyl group having 1 to 30 carbon atoms or alkenyl group.

The composition of the present invention containing the specific plasticizer enables the formed film forming material layer to exhibit excellent flexibility and flammability.

Therefore, even when the transfer film comprising the film forming material layer containing the specific plasticizer is bent, the surface of the film forming material layer is not finely cracked, and the transfer film has excellent suppleness and can be rolled easily.

Moreover, as the specific plasticizer can be easily decomposed by heat and removed, it does not reduce the light transmittance of a dielectric layer obtained by baking the film forming material layer.

In the above formula (1) representing the specific plasticizer, $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10. The alkyl group or alkenyl group represented by $R^1$ or $R^4$ and the alkylene group or alkenylene group represented by $R^2$ or $R^3$ may be straight-chain or branched.

The number of carbon atoms of the alkyl group represented by $R^1$ or $R^4$ is 1 to 30, preferably 2 to 20, more preferably 4 to 10.

When the number of carbon atoms of the alkyl group is more than 30, the solubility in a solvent of the plasticizer constituting the inorganic particle-containing composition may lower and excellent flexibility may not be obtained.

In the above formula (1), n is an integer of 1 to 10.

Illustrative examples of the compound represented by the above formula (1) include dibutyl adipate, diisobutyl adipate, di-2-ethylhexyl adipate, di-2-ethylhexyl azelate, dibutyl sebacate, dibutyl diglycol adipate and the like. Compounds of the formula (1) in which n is an integer of 2 to 6 are preferred.

In the above formula (2) representing the specific plasticizer, $R^5$ is an alkyl group having 1 to 30 carbon atoms or alkenyl group. The alkyl group and alkenyl group may be straight-chain or branched.

The number of carbon atoms of the alkyl group or alkenyl group represented by $R^5$ is 1 to 30, preferably 2 to 20, more preferably 10 to 18.

Illustrative examples of the compound represented by the above formula (2) include propylene glycol monolaurate, propylene glycol monooleate and the like.

The proportion of the specific plasticizer in the composition of the present invention is preferably 0.1 to 20 parts by weight, more preferably 0.5 to 10 parts by weight based on 100 parts by weight of the inorganic particles. When the proportion of the specific plasticizer is too small, the plasticity of the film forming material layer formed of the obtained composition can hardly be improved satisfactorily. When the proportion is too large, the tackiness of the film forming material layer formed of the obtained composition becomes too high with the result that a transfer film comprising the film forming material layer is inferior in handling properties.

<Solvent>

The composition of the present invention generally contains a solvent. The solvent preferably has excellent affinity for the inorganic particles and excellent solubility of the binder resin, can provide appropriate viscosity to the obtained composition and can be easily vaporized and removed by drying.

Illustrative examples of the solvent include ketones such as diethyl ketone, methylbutyl ketone, dipropyl ketone and cyclohexanone; alcohol's such as n-pentanol, 4-methyl-2-pentanol, cyclohexanol and diacetone alcohol; ether-based alcohol's such as ethylene glycol monomethyl ether, ethylene glycol monoethyl ether, ethylene glycol monobutyl ether, propylene glycol monomethyl ether and propylene glycol monoethyl ether; saturated aliphatic alkyl monocarboxylates such as n-butyl acetate and amyl acetate; lactates such as ethyl lactate and n-butyl lactate; ether-based esters such as methyl cellosolve acetate, ethyl cellosolve acetate, propylene glycol monomethyl ether acetate and ethyl-3-ethoxypropionate; and the like. These solvents may be used alone or in combination of two or more.

The proportion of the solvent in the composition of the present invention is preferably 40 parts or less by weight, more preferably 5 to 30 parts by weight based on 100 parts by weight of the inorganic particles from the viewpoint of maintaining the viscosity of the composition at a preferred range.

<Silane Coupling Agent>

The composition of the present invention may contain a silane coupling agent. The silane coupling agent is preferably an alkyl group-containing (alkyl)alkoxysilane represented by the following formula (4):

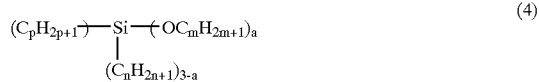

(4)

wherein p is an integer of 3 to 20, m is an integer of 1 to 3, n is an integer of 1 to 3, and a is an integer of 1 to 3.

In the above formula (4), p indicating the number of carbon atoms of an alkyl group is an integer of 3 to 20, preferably 4 to 16.

Even when an alkyl group-containing (alkyl)alkoxysilane of the formula (4) in which p is less than 3 is contained in the composition, a film forming material layer formed of the obtained composition may not have satisfactory flexibility. Since an alkyl group-containing (alkyl)alkoxysilane of the formula (4) in which p is more than 20 has high decomposition temperature, part of the organic substances may remain in the formed dielectric layer when the above silane compound is not completely decomposed and removed in the step of baking the film forming material layer of the obtained composition, whereby the light transmittance of the dielectric layer may be reduced.

Illustrative examples of the silane coupling agent represented by the above formula (4) include saturated alkyldimethyl methoxysilanes (a=1, m=1, n=1) such as n-propyldimethyl methoxysilane, n-butyldimethyl methoxysilane, n-decyldimethyl methoxysilane, n-hexadecyldimethyl methoxysilane and n-eicosanedimethyl methoxysilane; saturated alkyldiethyl methoxysilanes (a=1, m=1, n=2) such as n-propyldiethyl methoxysilane, n-butyldiethylmethoxysilane, n-decyldiethylmethoxysilane, n-hexadecyldiethyl methoxysilane and n-eicosanediethyl methoxysilane; saturated alkyldipropyl methoxysilanes (a=1, m=1, n=3) such as n-butyldipropyl methoxysilane, n-decyldipropyl methoxysilane, n-hexadecyldipropyl methoxysilane and n-eicosanedipropyl methoxysilane; saturated alkyldimethyl ethoxysilanes (a=1, m=2, n=1) such as n-propyldimethyl ethoxysilane, n-butyldimethyl ethoxysilane, n-decyldimethyl ethoxysilane, n-hexadecyldimethyl ethoxysilane and n-eicosanedimethyl ethoxysilane; saturated alkyldiethyl ethoxysilanes (a=1, m=2, n=2) such as n-propyldiethyl ethoxysilane, n-butyldiethyl ethoxysilane, n-decyldiethyl ethoxysilane, n-hexadecyldiethyl ethoxysilane and n-eicosanediethyl ethoxysilane; saturated alkyldipropyl ethoxysilanes (a=1, m=2, n=3) such as n-butyldipropyl ethoxysilane, n-decyldipropyl ethoxysilane, n-hexadecyldipropyl ethoxysilane and n-eicosanedipropyl ethoxysilane; saturated alkyldimethyl propoxysilanes (a=1, m=3, n=1) such as n-propyldimethyl propoxysilane, n-butyldimethyl propoxysilane, n-decyldimethyl propoxysilane, n-hexadecyldimethyl propoxysilane and n-eicosanedimethyl propoxysilane; saturated alkyldiethyl propoxysilanes (a=1, m=3, n=2) such as n-propyldiethyl propoxysilane, n-butyldiethyl propoxysilane, n-decyldiethyl propoxysilane, n-hexadecyldiethyl propoxysilane and n-eicosanediethyl propoxysilane; saturated alkyldipropyl propoxysilanes (a=1, m=3, n=3) such as n-butyldipropyl propoxysilane, n-decyldipropyl propoxysilane, n-hexadecyldipropyl propoxysilane and n-eicosanedipropyl propoxysilane; saturated alkylmethyl dimethoxysilanes (a=2, m=1, n=1) such as n-propylmethyl dimethoxysilane, n-butylmethyl dimethoxysilane, n-decylmethyl dimethoxysilane, n-hexadecylmethyl dimethoxysilane and n-eicosanemethyl dimethoxysilane; saturated alkylethyl dimethoxysilanes (a=2, m=1, n=2) such as n-propylethyl dimethoxysilane, n-butylethyl dimethoxysilane, n-decylethyl dimethoxysilane, n-hexadecylethyl dimethoxysilane and n-eicosaneethyl dimethoxysilane; saturated alkylpropyl dimethoxysilanes (a=2, m=1, n=3) such as n-butylpropyl dimethoxysilane, n-decylpropyl dimethoxysilane, n-hexadecylpropyl dimethoxysilane and n-eicosanepropyl dimethoxysilane; saturated alkylmethyl diethoxysilanes (a=2, m=2, n=1) such as n-propylmethyl diethoxysilane, n-butylmethyl diethoxysilane, n-decylmethyl diethoxysilane, n-hexadecylmethyl diethoxysilane and n-eicosanemethyl diethoxysilane; saturated alkylethyl diethoxysilanes (a=2, m=2, n=2) such as n-propylethyl diethoxysilane, n-butylethyl diethoxysilane, n-decylethyl diethoxysilane, n-hexadecylethyl diethoxysilane and n-eicosaneethyl diethoxysilane; saturated alkylpropyl diethoxysilanes (a=2, m=2, n=3) such as n-butylpropyl diethoxysilane, n-decylpropyl diethoxysilane, n-hexadecylpropyl diethoxysilane and n-eicosanepropyl diethoxysilane; saturated alkylmethyl dipropoxysilanes (a=2, m=3, n=1) such as n-propylmethyl dipropoxysilane, n-butylmethyl dipropoxysilane, n-decylmethyl dipropoxysilane, n-hexadecylmethyl dipropoxysilane and n-eicosanemethyl dipropoxysilane; saturated alkylethyl dipropoxysilanes (a=2, m=3, n=2) such as n-propylethyl dipropoxysilane, n-butylethyl dipropoxysilane, n-decylethyl dipropoxysilane, n-hexadecylethyl dipropoxysilane and n-eicosaneethyl dipropoxysilane; saturated alkylpropyl dipropoxysilanes (a=2, m=3, n=3) such as n-butylpropyl dipropoxysilane, n-decylpropyl dipropoxysilane, n-hexadecylpropyl dipropoxysilane and n-eicosanepropyl dipropoxysilane; saturated alkyl trimethoxysilanes (a=3, m=1) such as n-propyl trimethoxysilane, n-butyl trimethoxysilane, n-decyl trimethoxysilane, n-hexadecyl trimethoxysilane and n-eicosane trimethoxysilane; saturated alkyl triethoxysilanes (a=3, m=2) such as n-propyl triethoxysilane, n-butyl triethoxysilane, n-decyl triethoxysilane, n-hexadecyl triethoxysilane and n-eicosane triethoxysilane; and saturated alkyl tripropoxysilanes (a=3, m=3) such as n-propyl tripropoxysilane, n-butyl tripropoxysilane, n-decyl tripropoxysilane, n-hexadecyl tripropoxysilane and n-eicosane tripropoxysilane. They may be used alone or in combination of two or more.

Out of these, n-butyl trimethoxysilane, n-decyl trimethoxysilane, n-hexadecyl trimethoxysilane, n-decyldimethyl methoxysilane, n-hexadecyldimethyl methoxysilane, n-butyl triethoxysilane, n-decyl triethoxysilane, n-hexadecyl triethoxysilane, n-decylethyl diethoxysilane, n-hexadecylethyl diethoxysilane, n-butyl tripropoxysilane, n-decyl tripropoxysilane and n-hexadecyl tripropoxysilane are particularly preferred.

The proportion of the silane coupling agent in the composition of the present invention is preferably 0.001 to 10 parts by weight, more preferably 0.001 to 5 parts by weight based on 100 parts by weight of the inorganic particles. When the proportion of the silane coupling agent is too small, the effect of improving the dispersion stability of the inorganic particles and the effect of improving the flexibility of the formed film forming material layer can hardly be developed in full. When the proportion is too large, the viscosity of the obtained composition may rise with the passage of time when it is preserved, or a reaction may occur between the silane coupling agents, thereby reducing light transmittance after baking.

The composition of the present invention may contain such additives as a dispersant, tackiness providing agent, surface tension control agent, stabilizer, antifoaming agent and the like as optional components, in addition to the above components.

The composition of the present invention can be prepared by kneading the above inorganic particles, binder resin, specific plasticizer, solvent and optional components with a kneader such as a roll kneader, mixer or homomixer.

The composition of the present invention prepared as described above is a pasty composition having fluidity suitable for coating. The viscosity of the composition of the present invention is preferably 1,000 to 30,000 cp, more preferably 3,000 to 10,000 cp.

The composition of the present invention can be particularly advantageously used to produce the transfer film of the present invention which will be detailed hereinunder.

The composition of the present invention can be advantageously used in a conventionally known method of forming a film forming material layer, that is, a method of forming a film forming material layer by directly coating the composition on the surface of a substrate by a screen printing method and drying the coating film.

<Transfer Film>

The transfer film of the present invention is a composite film which is advantageously used in the step of forming a constituent element of a PDP, particularly the step of forming a dielectric layer and comprises a film forming material layer formed by coating the composition of the present invention on the surface of a base film and drying the coating film. That is, the transfer film of the present invention comprises a base film and a film forming material layer containing inorganic particles, a binder resin and a specific plasticizer and formed on the base film.

The transfer film of the present invention may be a laminate film obtained by forming a resist film which will be described hereinafter on a base film, coating the composition of the present invention on the resist film and drying the coating film.

(1) Constitution of Transfer Film:

FIG. 2(a) is a schematic sectional view of the rolled transfer film of the present invention and FIG. 2(b) is a sectional view showing the layer structure of the transfer film [detail view of a portion (X)].

Figure 2:
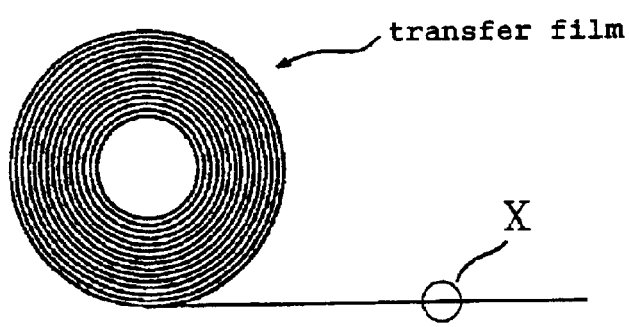
FIG. 2(a) is a schematic sectional view of a transfer film of the present invention and FIG. 2(b) is a sectional view showing the layer structure of the transfer film.
Figure 2:
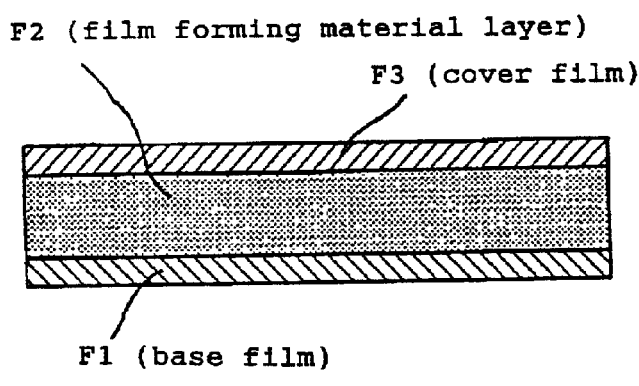

The transfer film shown in FIG. 2 is a composite film used to form a dielectric layer constituting a PDP as an example of the transfer film of the present invention. The transfer film generally comprises a base film F1, a film forming material layer F2 which is formed on the surface of the base film F1 and can be peeled off, and a cover film F3 which is formed on the surface of the film forming material layer F2 and can be peeled off. The cover film F3 may not be used according to the properties of the film forming material layer F2.

The base film F1 constituting the transfer film is preferably a resin film having heat resistance, solvent resistance and flexibility. When the base film F1 has flexibility, the pasty composition of the present invention can be coated by a roll coater or blade coater, thereby making it possible to form a film forming material layer having uniform thickness and to keep and supply the formed film forming material layer in the form of a roll.

A resin forming the base film F1 is, for example, polyethylene terephthalate, polyester, polyethylene, polypropylene, polystyrene, polyimide, polyvinyl alcohol, polyvinyl chloride, fluororesin such as polyfluoroethylene, nylon or cellulose. The base film F1 has a thickness of 20 to 100 μm, for example.

The film forming material layer F2 constituting the transfer film is a layer which turns into a glass sintered body (dielectric layer) by baking and contains glass powders (inorganic particles), a binder resin and a specific plasticizer as essential ingredients.

The thickness of the film forming material layer F2, which differs according to the content of the glass powders and the type and size of a panel, is 5 to 200 μm, preferably 10 to 100 μm. When the thickness is smaller than 5 μm, the thickness of the finally formed dielectric layer becomes too small and desired dielectric characteristics may not be ensured. When this thickness is in the range of 10 to 100 μm, the thickness of the dielectric layer required for a large-sized panel can be ensured.

The cover film F3 constituting the transfer film is a film for protecting the surface of the film forming material layer F2 (contact surface with the glass substrate). This cover film F3 is preferably a resin film having flexibility. Illustrative examples of the resin forming the cover film F3 are the same as those listed for the base film F1. The thickness of the cover film F3 is 20 to 100 μm, for example.

(2) Transfer Film Production Process:

The transfer film of the present invention can be produced by forming the film forming material layer F2 on the base film F1 and forming the cover film F3 on the film forming material layer F3 (press bonding).

To form the film forming material layer, the composition of the present invention containing inorganic particles, a binder resin, a specific plasticizer and a solvent is coated on the surface of a base film and the coating film is dried to remove part or all of the solvent.

To coat the composition of the present invention on the surface of the base film, a roll coater, blade coater such as a doctor blade, curtain coater, wire coater or the like is preferably used because a coating film having excellent thickness uniformity can be efficiently formed.

The surface of the base film coated with the composition of the present invention is preferably subjected to a release treatment. Thereby, the base film can be easily peeled off from the film forming material layer after the film forming material layer is transferred.

The coating film of the composition of the present invention formed on the base film is dried to remove part or all of the solvent and turns into a film forming material layer constituting the transfer film. Conditions for drying the coating film of the composition of the present invention include a temperature of 40 to 150° C. and a time of about 0.1 to 30 minutes. The content of the solvent after drying, that is, the content of the solvent in the film forming material layer is preferably 10 wt % or less, more preferably 1 to 5 wt % so as to cause the film forming material layer to exhibit tackiness to the substrate and appropriate shape retention properties.

The surface of the cover film formed on the film forming material layer formed as described above (generally press-bonded under heating) is preferably subjected to a release treatment as well. Thereby, the cover film can be easily peeled off from the film forming material layer before the film forming material layer is transferred.

(3) Transfer of Film Forming Material Layer (Usage of Transfer Film):

The film forming material layer formed on the base film is transferred to the surface of the substrate en bloc. Since the transfer film of the present invention enables the film forming material layer to be formed on the glass substrate by the above simple operation without fail, the efficiency of the step of forming a constituent element of a PDP such as a dielectric layer can be improved and the improvement of the quality of the formed constituent element, for example, the development of stable dielectric characteristics in the dielectric layer can be realized.

<PDP Production Process (Formation of Dielectric Layer)>

The production process of the present invention comprises the steps of transferring a film forming material layer constituting the transfer film of the present invention to the surface of a substrate and baking the transferred film forming material layer to form a dielectric layer on the surface of the substrate.

An example of the step of transferring the film forming material layer of the transfer film constituted as shown in FIG. 2 is as follows.

(1) The transfer film in the form of a roll is cut to a size corresponding to the area of the substrate.
(2) After the cover film F3 is peeled off from the surface of the film forming material layer F2 of the cut transfer film, the transfer film is placed upon the surface of the substrate in such a manner that the surface of the film forming material layer F2 comes into contact with the substrate.
(3) A heating roll is moved over the transfer film placed upon the substrate to press bond the transfer film under heating.
(4) The base film F1 is peeled off and removed from the film forming material layer F2 press-bonded to the substrate under heating.

The film forming material layer F2 formed on the base film F1 is transferred to the surface of the substrate by the above operation. Transfer conditions include a heating roll surface temperature of 60 to 120° C., a heating roll pressure of 1 to 5 kg/cm², and a heating roll moving speed of 0.2 to 10.0 m/min. This operation (transfer step) can be carried out with a laminator. The substrate may be preheated at a temperature of 40 to 100° C., for example.

The film forming material layer F2 transferred to the surface of the substrate turns into an inorganic sintered body (dielectric layer) by baking. Baking is carried out by placing the substrate having the film forming material layer F2 transferred thereto in a high-temperature atmosphere. Thereby, the organic substances (for example, the binder resin, residual solvent, specific plasticizer, various additives) contained in the film forming material layer F2 are decomposed and removed, and the inorganic particles are molten and sintered. The sintering temperature which differs according to the melting temperature of the substrate and the constituent components of the film forming material layer is, for example, 300 to 800° C., preferably 400 to 600° C.

<PDP Production Process (Formation of Constituent Element Making Use of Photoresist Method)>

The production process of the present invention comprises the steps of transferring a film forming material layer constituting the transfer film of the present invention to the surface of a substrate, forming a resist film on the transferred film forming material layer, exposing the resist film to form a resist pattern latent image, developing the resist film to form a resist pattern, etching the film forming material layer to form a pattern layer corresponding to the resist pattern and baking the pattern layer to form a constituent element selected from the group consisting of a barrier, electrode, resistor, dielectric layer, phosphor, color filter and black matrix.

Alternatively, the production process of the present invention comprises the steps of forming a laminate film consisting of a resist film and a film forming material layer formed of the composition of the present invention on a base film in the order named, transferring the laminate film formed on the base film to the surface of a substrate, exposing the resist film constituting the laminate film to form a resist pattern latent image, developing the resist film to form a resist pattern, etching the film forming material layer to form a pattern layer corresponding to the resist pattern and baking the pattern layer to form a constituent element selected from the group consisting of a barrier, electrode, resistor, dielectric layer, phosphor, color filter and black matrix.

A method of forming "barriers" which are a constituent element of a PDP on the rear surface of a substrate will be described hereinunder. This method comprises (1) the step of transferring a film forming material layer, (2) the step of forming a resist film, (3) the step of exposing the resist film, (4) the step of developing the resist film, (5) the step of etching the film forming material layer and (6) the step of baking a barrier pattern to form barriers on the surface of the substrate.

Figure 3:
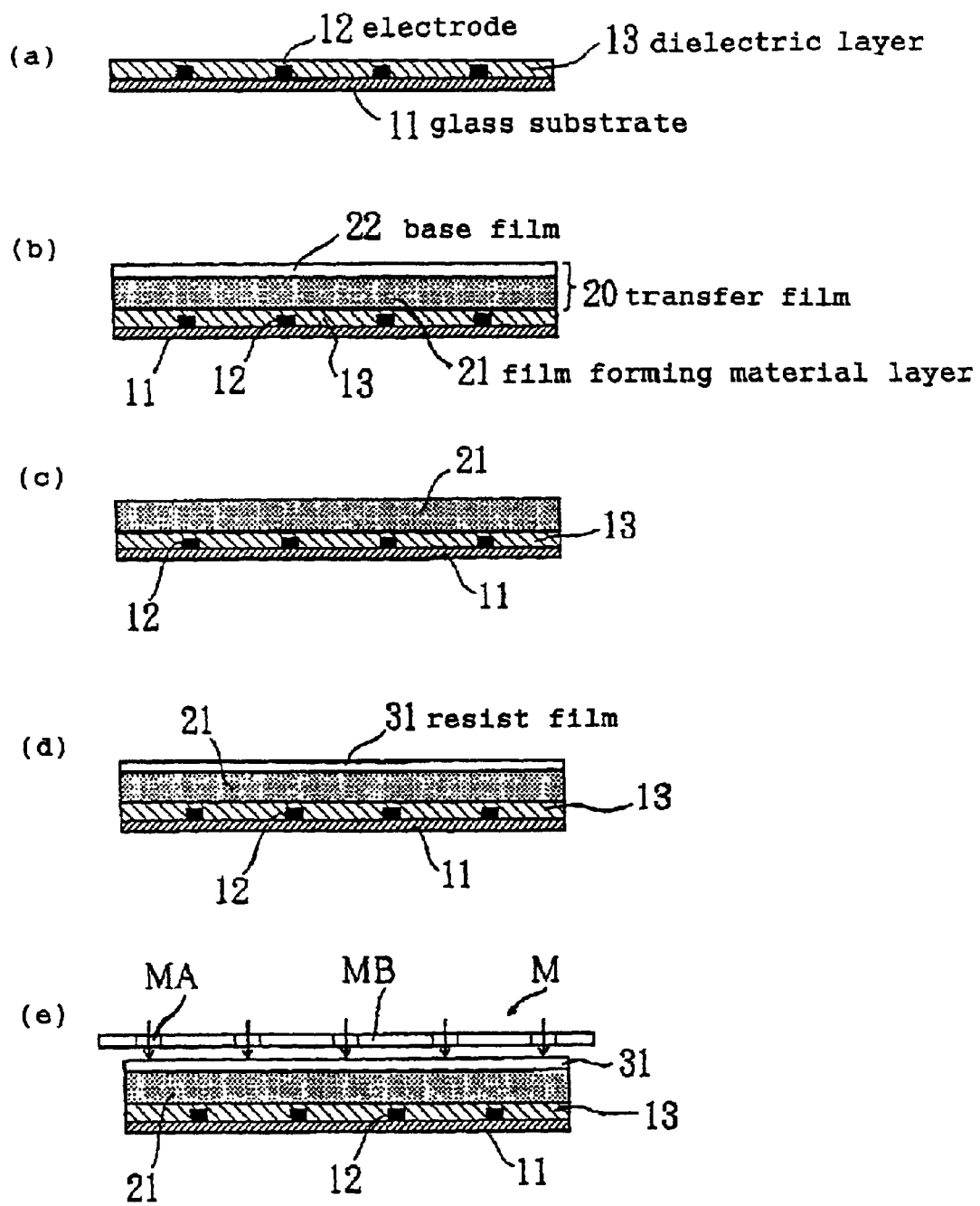
FIG. 3 are schematic sectional views showing an example of a barrier forming process (transfer step, resist film forming step and exposure step) in the production process of the present invention.
Figure 4:
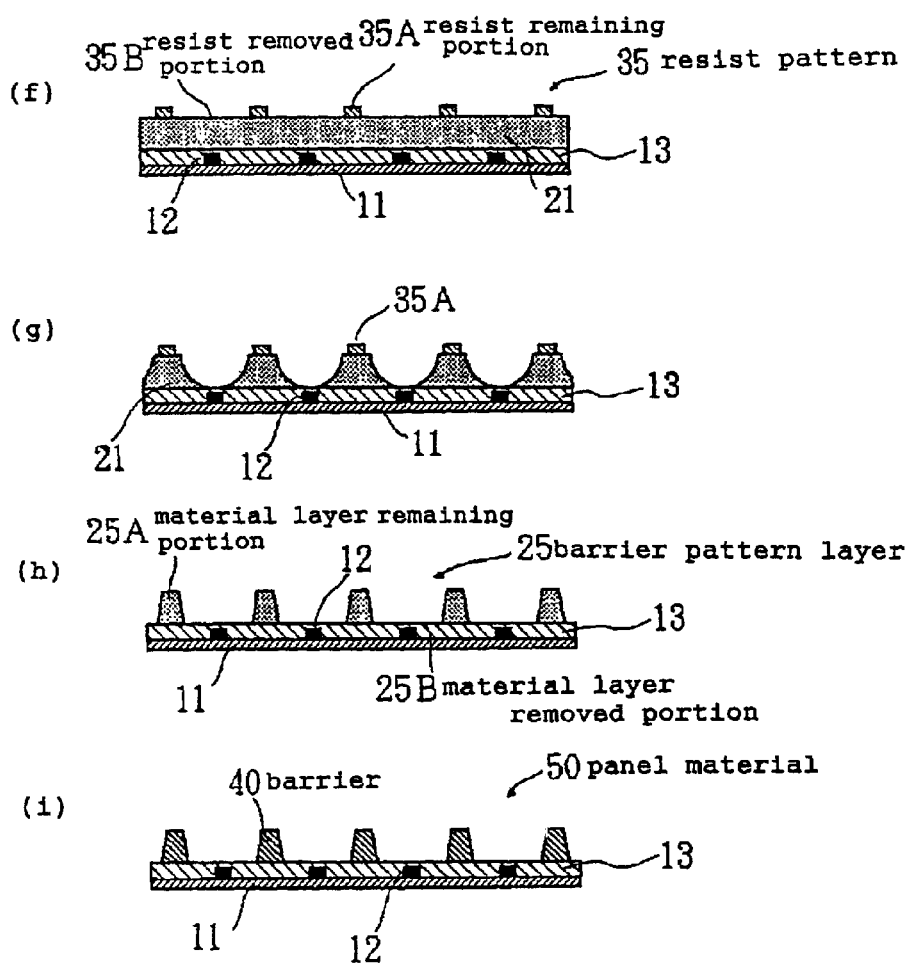
FIG. 4 are schematic sectional views showing an example of a barrier forming process (developing step, etching step and baking step) in the production process of the present invention.

FIG. 3 and FIG. 4 are schematic sectional views showing a series of steps of forming the barriers. In FIG. 3 and FIG. 4, reference numeral 11 denotes a glass substrate on which electrodes 12 for generating plasma are arranged at equal intervals and covered with a dielectric layer 13 formed on the surface.

In the present invention, the expression "transferring a film forming material layer to the surface of a substrate" means not only "transferring the film forming material layer to the surface of the above glass substrate 11" but also "transferring the film forming material layer to the surface of the above dielectric layer 13".

(1) Step of Transferring Film Forming Material Layer:

An example of the step of transferring the film forming material layer is given below.

After the cover film (not shown) of the transfer film is peeled off, as shown in FIG. 3(b), the transfer film 20 is placed upon the surface of the dielectric layer 13 in such a manner that the surface of the film forming material layer 21 comes into contact with the dielectric layer 13 and press-bonded with a heating roll, and the base film 22 is peeled off and removed from the film forming material layer 21. Thereby, as shown in FIG. 3(c), the film forming material layer 21 is transferred and closely bonded to the surface of the dielectric layer 13. Transfer conditions include a heating roll surface temperature of 80 to 140° C., a heating roll pressure of 1 to 5 kg/cm$^2$ and a heating roll moving speed of 0.1 to 10.0 m/min. The glass substrate 11 may be preheated at a temperature of 40 to 100° C., for example.

(2) Step of Forming Resist Film:

In this step, as shown in FIG. 3(d), the resist film 31 is formed on the surface of the transferred film forming material layer 21. A resist constituting this resist film 31 may be either a positive resist or a negative resist.

The resist film 31 can be formed by coating a resist by a screen printing method, roll coating method, rotation coating method, cast coating method or the like and drying the coating film. The drying temperature of the coating film is generally about 60 to 130° C.

A resist film formed on the base film may be transferred to the surface of the film forming material layer 21. This method can reduce the number of steps of forming the resist film and makes it possible to obtain a resist film having excellent thickness uniformity, whereby the development of the resist film and the etching of the film forming material layer are carried out uniformly and the formed barriers become uniform in height and shape.

The resist film 31 has a thickness of 0.1 to 40 μm, preferably 0.5 to 20 μm.

(3) Step of Exposing Resist Film:

In this step, as shown in FIG. 3(e), the surface of the resist film 31 formed on the film forming material layer 21 is selectively irradiated with (exposed to) radiation such as ultraviolet radiation through an exposure mask M to form a resist pattern latent image. In the figure, MA and MB signify a light transmitting portion and a light shielding portion formed by the exposure mask M, respectively.

An irradiation device is not particularly limited and may be an ultraviolet irradiation device used for photolithography and an exposure device used for the production of semiconductors and liquid crystal display devices.

(4) Step of Developing Resist Film:

In this step, the exposed resist film is developed to form a resist pattern (latent image).

As developing conditions, the type, composition and concentration of a developer, developing time, developing temperature, developing method (such as an immersion, rocking, shower, spray or puddling method) and developing device may be suitably selected according to the type of the resist film 31.

A resist pattern 35 (pattern corresponding to the exposure mask M) consisting of resist remaining portions 35A and resist removed portions 35B is formed by this developing step as shown in FIG. 4(f).

This resist pattern 35 serves as an etching mask in the following step (etching step) and the constituent material (photo-cured resist) of the resist remaining portions 35A must have a lower dissolution speed in an etching solution than the constituent material of the film forming material layer 21.

(5) Step of Etching Film Forming Material Layer:

In this step, the film forming material layer is etched to form a barrier pattern layer corresponding to the resist pattern.

That is, as shown in FIG. 4(g), portions corresponding to the resist removed portions 35B of the resist pattern 35 of the film forming material layer 21 are dissolved in the etching solution and selectively removed. FIG. 4(g) shows that the film forming material layer 21 is being etched.

When etching is further continued, as shown in FIG. 4(h), predetermined portions of the film forming material layer 21 are completely removed and the dielectric layer 13 is exposed. Thereby, a barrier pattern layer 25 consisting of material layer remaining portions 25A and material layer removed portions 25B is formed.

As etching conditions, the type, composition and concentration of the etching solution, etching time, etching temperature, etching method (such as an immersion, rocking, shower, spray or puddling method) and etching device may be suitably selected according to the type of the film forming material layer 21.

The type of the resist film 31 and the type of the film forming material layer 21 are selected such that the same solution as the developer used in the developing step can be used as the etching solution in order to carry out the developing step and the etching step continuously, thereby making it possible to improve production efficiency due to the simplification of the process.

Preferably, the resist remaining portions 35A constituting the resist pattern 35 are gradually dissolved by etching and completely removed when the barrier pattern layer 25 is formed (at the end of etching). Even when part or all of the resist remaining portions 35A remain after etching, the resist remaining portions 35A are removed in the following baking step.

(6) Step of Baking Barrier Pattern Layer:

In this step, barriers are formed by baking the barrier pattern layer 25. Thereby, the organic substances contained in the material layer remaining portions 25A are calcined and barriers are formed, whereby a panel material 50 having barriers 40 formed on the surface of the dielectric layer 13 as shown in FIG. 4(i) is obtained. In this panel material 50, spaces partitioned by the barriers 40 (spaces derived from the material layer removed portions 25B) serve as plasma working spaces.

The baking temperature must be a temperature at which the organic substances contained in the material layer remaining portions (25A) are calcined, generally 400 to 600° C. The baking time is generally 10 to 90 minutes.

<Preferred Embodiment Making Use of Photoresist Method>

The process for forming a PDP in the present invention is not limited to the process shown in FIG. 3 and FIG. 4.

Other preferred process for forming a constituent element of a PDP comprises the following steps (1) to (3).

(1) After a resist film is formed on a base film, the inorganic particle-containing composition of the present invention is coated on the surface of the resist film and dried to form a film forming material layer. A roller coater may be used to form the resist film and the film forming material layer, thereby making it possible to form a laminate film having excellent thickness uniformity on the base film.

(2) The laminate film consisting of the resist film and the film forming material layer formed on the base film is transferred to the surface of a substrate. Transfer conditions may be the same as those in the above "step of transferring film forming material layer".

(3) The same operations as described in the above "step of exposing resist film", "step of developing resist film", "step of etching film forming material layer" and "step of baking barrier pattern layer" are carried out. As described in the foregoing, the developer of the resist film and the etching solution of the film forming material layer are preferably made the same so that the "step of developing resist film" and the "step of etching film forming material layer" are carried out continuously.

Since the film forming material layer and the resist film are transferred to the surface of the substrate by the above method en bloc, production efficiency can be further improved by the simplification of the process.

The method of forming "barriers" as a constituent element of a PDP has been described above. Electrodes, resistor, dielectric layer, phosphor, color filter and black matrix constituting a PDP can be formed in accordance with this method.

The following examples are provided for the purpose of further illustrating the present invention but are in no way to be taken as limiting. "Parts" in the following examples means "parts by weight".

EXAMPLE 1

(1) Preparation of Glass Paste Composition (Inorganic Particle-containing Composition):

The composition of the present invention having a viscosity of 4,000 cp was prepared by kneading together 100 parts of a $PbO$—$B_2O_3$—$SiO_2$ mixture (softening point of 500° C.) consisting of 70 wt % of lead oxide, 10 wt % of boron oxide and 20 wt % of silicon oxide, 20 parts of polybutyl methacrylate as a binder resin (weight average molecular weight of 50,000) as a binder resin, 1 part of a compound represented by the following formula (a) (propylene glycol monooleate) as a specific plasticizer and 20 part of propylene glycol monomethyl ether as a solvent with a dispersion mixer.

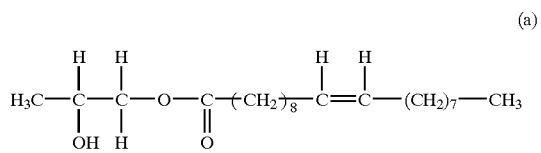

(a)

(2) Production and Evaluation (Flexibility and Handling Properties) of Transfer Film:

The composition of the present invention prepared in (1) above was coated on a polyethylene terephthalate (PET) base film which had been subjected to a release treatment (width of 400 mm, length of 30 m, thickness of 38 μm) using a blade coater and the formed coating film was dried at 100° C. for 5 minutes to remove the solvent, thereby forming a 50 μm-thick film forming material layer on the base film. Thereafter, a PET cover film (width of 400 mm, length of 30 m, thickness of 25 μm) which has been subjected to a release treatment was laminated on the film forming material layer to produce the transfer film of the present invention constituted as shown in FIG. 2.

The obtained transfer film had suppleness and could be easily rolled. The film forming material layer had excellent flexibility that the surface of the film forming material layer was not cracked even when this transfer film was bent.

The cover film was removed from this transfer film and the transfer film (laminate consisting of the base film and the film forming material layer) was placed upon a glass substrate without applying pressure in such a manner that the surface of the film forming material layer came into contact with the surface of the glass substrate, and then the transfer film was removed from the surface of the glass substrate. The film forming material layer showed appropriate tackiness to the glass substrate and the transfer film could be removed without causing a cohesive failure in the film forming material layer. Therefore, the transfer film had excellent handling properties.

(3) Transfer of Film Forming Material Layer:

After the cover film was removed from the transfer film obtained in (2) above, the transfer film (laminate consisting of the base film and the film forming material layer) was placed upon a glass substrate for a 20-inch panel in such a manner that the surface of the film forming material layer came into contact with the surface (bus electrode fixed surface) of the glass substrate and press-bonded with a heating roll under heating. Press bonding conditions included a heating roll surface temperature of 110° C., a roll pressure of 3 kg/cm and a heating roll moving speed of 1 m/min.

After the end of press-bonding, the base film was peeled off and removed from the film forming material layer fixed (bonded under heating) to the surface of the glass substrate to complete the transfer of the film forming material layer.

When the base film was peeled off in this transfer step, the film forming material layer had sufficiently large film strength that a cohesive failure did not occur in the film forming material layer. Further, the transferred film forming material layer had excellent adhesion to the surface of the glass substrate.

(4) Baking of Film Forming Material Layer (Formation of Dielectric Layer):

The glass substrate having the film forming material layer transferred in (3) above was placed in a kiln and baked at 590C. for 30 minutes by elevating the temperature inside the kiln from normal temperature to 590° C. at a rate of 10° C./min to form an achromatic transparent dielectric layer made of a glass sintered body on the surface of the glass substrate.

When the thickness (average thickness and tolerance) of this dielectric layer was measured, it was in the range of 30 μm±0.4 μm. Thus, the dielectric layer had excellent thickness uniformity.

When 5 panel materials, each comprising a glass substrate having a dielectric layer, were produced and the light transmittance of each of the formed dielectric layers was measured (measurement wavelength of 600 nm), it was 95%. Thus, it was confirmed that all the dielectric layers had excellent transparency.

EXAMPLE 2

The composition of the present invention having a viscosity of 4,000 cp was prepared in the same manner as in (1) of Example 1 except that the amount of the compound (specific plasticizer) represented by the above formula (a) was changed to 5 parts and the transfer film of the present invention having suppleness was produced in the same manner as in (2) of Example 1 except that the composition was used.

The obtained transfer film was used for the evaluation of flexibility and handling properties of the film forming material layer in the same manner as in (2) of Example 1. The film forming material layer had excellent flexibility that the surface of the film forming material layer was not cracked (flex cracking) when the transfer film was bent. The transfer film had excellent handling properties.

The film forming material layer was transferred in the same manner as in (3) of Example 1 except that the obtained transfer film was used. The film forming material layer had sufficiently large film strength that a cohesive failure did not occur in the film forming material layer when the base film was removed in this transfer step. Further, the transferred film forming material layer had excellent adhesion to the surface of the glass substrate.

The glass substrate having the film forming material layer transferred thereto was baked in the same manner as in (4) of Example 1 to form an achromatic transparent dielectric layer made of a glass sintered body on the surface of the glass substrate.

When the thickness of the dielectric layer (average film thickness and tolerance) was measured, it was in the range of 30 μm±0.5 μm. Thus, the dielectric layer had excellent thickness uniformity.

When 5 panel materials, each comprising a glass substrate having a dielectric layer, were produced and the light transmittance of each of the formed dielectric layers was measured (measurement wavelength of 600 nm), it was 95%. Thus, it was confirmed that all the dielectric layers had excellent transparency.

EXAMPLE 3

The composition of the present invention having a viscosity of 3,500 cp was prepared in the same manner as in (1) of Example 1 except that 5 parts of a compound represented by the following formula (b) (di-2-ethylhexyl azelate) was used in place of the compound represented by the above formula (a) and the transfer film of the present invention having suppleness was produced in the same manner as in (2) of Example 1 except that the composition was used.

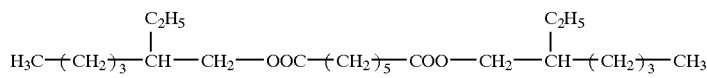

The obtained transfer film was used for the evaluation of flexibility and handling properties of the film forming material layer in the same manner as in (2) of Example 1. The film forming material layer had excellent flexibility that the surface of the film forming material layer was not cracked (flex cracking) when the transfer film was bent. The transfer film had excellent handling properties.

The film forming material layer was transferred in the same manner as in (3) of Example 1 except that the obtained transfer film was used. The film forming material layer had sufficiently large film strength that a cohesive failure did not occur in the film forming material layer when the base film was removed in this transfer step. Further, the transferred film forming material layer had excellent adhesion to the surface of the glass substrate.

The glass substrate having the film forming material layer transferred thereto was baked in the same manner as in (4) of Example 1 to form an achromatic transparent dielectric layer made of a glass sintered body on the surface of the glass substrate.

When the thickness of the dielectric layer (average film thickness and tolerance) was measured, it was in the range of 30 μm±0.5 μm. Thus, the dielectric layer had excellent thickness uniformity.

When 5 panel materials, each comprising a glass substrate having a dielectric layer, were produced and the light transmittance of each of the formed dielectric layers was measured (measurement wavelength of 600 nm), it was 95%. Thus, it was confirmed that all the dielectric layers had excellent transparency.

COMPARATIVE EXAMPLE 1

A composition for comparison having a viscosity of 3,000 cp was prepared in the same manner as in (1) of Example 1 except that a specific plasticizer was not used and a transfer film for comparison was produced in the same manner as in (2) of Example 1 except that the composition was used.

The obtained transfer film was inferior in suppleness and difficult to be rolled. When the transfer film was bent, the surface of the film forming material layer was markedly cracked (flex cracking). Thus, the film forming material layer was inferior in flexibility.

The film forming material layer was transferred in the same manner as in (3) of Example 1 except that the obtained transfer film was used and further the glass substrate having the film forming material layer transferred thereto was baked in the same manner as in (4) of Example 1 to form an achromatic dielectric layer made of a glass sintered body on the surface of the glass substrate.

When the thickness of the dielectric layer (average film thickness and tolerance) was measured, it was in the range of 30 μm±0.5 μm.

REFERENCE EXAMPLE 1

A composition having a viscosity of 4,000 cp was prepared in the same manner as in (1) of Example 1 except that the amount of the compound (specific plasticizer) represented by the above formula (a) was changed to 0.1 part and a transfer film was produced in the same manner as in (2) of Example 1 except that the composition was used.

The obtained transfer film was slightly inferior in suppleness and slightly difficult to be rolled. When the transfer film was bent, the surface of the film forming material layer was slightly cracked (flex cracking).

The film forming material layer was transferred in the same manner as in (3) of Example 1 except that the obtained transfer film was used and further the glass substrate having the film forming material layer transferred thereto was baked in the same manner as in (4) of Example 1 to form an achromatic dielectric layer made of a glass sintered body on the surface of the glass substrate.

When the thickness of the dielectric layer (average film thickness and tolerance) was measured, it was in the range of 30 μm±0.5 μm.

REFERENCE EXAMPLE 2

A composition having a viscosity of 4,500 cp was prepared in the same manner as in (1) of Example 1 except that the amount of the compound (specific plasticizer) represented by the above formula (a) was changed to 20 parts and a transfer film was produced in the same manner as in (2) of Example 1 except that the composition was used.

The obtained transfer film was used for the evaluation of flexibility of the film forming material layer in the same manner as in (2) of Example 1. The film forming material layer had excellent flexibility that the surface of the film forming material layer was not cracked (flex cracking) even when the transfer film was bent.

The cover film was removed from the transfer film, the transfer film (laminate consisting of the base film and the film forming material layer) was placed upon a glass substrate without applying pressure to the transfer film in such a manner that the surface of the film forming material layer came into contact with the surface of the glass substrate, and then the transfer film was removed from the surface of the glass substrate. At this point, the tackiness of the film forming material layer to the glass substrate was too large and hence, part of the film forming material layer was adhered to the glass substrate. Thus, the transfer film was inferior in handling properties.

The film forming material layer was transferred in the same manner as in (3) of Example 1 except that the obtained transfer film was used and further the glass substrate having the film forming material layer transferred thereto was baked in the same manner as in (4) of Example 1 to form an achromatic dielectric layer made of a glass sintered body on the surface of the glass substrate.

When the thickness of the dielectric layer (average film thickness and tolerance) was measured, it was in the range of 30 $\mu$m±0.5 $\mu$m.

EXAMPLE 4

(1) Preparation of Conductive Pasty Composition (Inorganic Particle-containing Composition):

The composition of the present invention for forming electrodes was prepared by kneading together 100 parts of silver powders as inorganic particles, 40 parts of an n-butyl methacrylate/methacrylic acid (weight ratio of 70/30) copolymer (weight average molecular weight of 70,000) as a binder resin, 5 parts of a compound represented by the above formula (a) (propylene glycol monooleate) as a specific plasticizer and 20 part of propylene glycol monomethyl ether as a solvent with a dispersion mixer.

(2) Preparation of Resist Composition:

A pasty alkali development radiation sensitive resist composition was prepared by kneading together 50 parts of an n-butyl methacrylate/methacrylic acid (weight ratio of 85/15) copolymer (weight average molecular weight of 50,000) as an alkali-soluble resin, 40 parts of pentaerythritol tetraacrylate as a polyfunctional monomer (radiation sensitive component), 5 parts of 2-benzyl-2-dimethylamino-1-(4-morpholinophenyl)-butan-1-one as a photopolymerization initiator (radiation sensitive component) and 150 parts of ethyl 3-ethoxypropionic acid as a solvent.

(3) Production and Evaluation (Flexibility and Handling Properties) of Transfer Film:

The resist composition obtained in (2) above was coated on the surface of the same base film as used in Example 1 with a blade coater and the formed coating film was dried at 100° C. for 5 minutes to remove the solvent, thereby producing a 5 $\mu$m-thick resist film on the base film. Thereafter, the composition for forming electrodes obtained in (1) above was coated on the surface of the resist film and dried to form a 20 $\mu$m-thick film forming material layer. A cover film was then formed on the film forming material layer in the same manner as in Example 1 to produce the transfer film of the present invention.

The obtained transfer film was used for the evaluation of flexibility and handling properties of the film forming material layer in the same manner as in (2) of Example 1. The film forming material layer had excellent flexibility that the surface of the film forming material layer was not cracked (flex cracking) even when the transfer film was bent. This transfer film had excellent handling properties.

(4) Transfer of Film Forming Material Layer:

After the cover film was removed from the transfer film obtained in (3) above, the transfer film was placed upon a glass substrate for a 6-inch panel in such a manner that the surface of the film forming material layer came into contact with the surface of the glass substrate and then press-bonded by a heating roll under heating. Press-bonding conditions included a heating roll surface temperature of 120° C., a roll pressure of 4 kg/cm$^2$ and a heating roll moving speed of 0.5 m/min.

After the end of press-bonding under heating, the base film was peeled off and removed from the resist film to complete the transfer of the laminate film consisting of the film forming material layer and the resist film.

When the base film was peeled off in this transfer step, the film forming material layer had sufficiently large film strength that a cohesive failure did not occur in the film forming material layer. Further, the transferred film forming material layer had excellent adhesion to the surface of the glass substrate.

(5) Exposure of Resist Film:

The resist film was exposed to an i-ray (ultraviolet light having a wavelength of 365 nm) from an ultra-high pressure mercury lamp through an exposure mask (50 $\mu$m-wide stripe pattern). The amount of exposure was 400 mJ/cm$^2$.

(6) Development of Resist Film and Etching of Film Forming Material Layer:

The exposed resist film was developed by a shower method using a 0.2 wt % potassium hydroxide aqueous solution (25° C.) as a developer for 20 seconds. Thereafter, the resist film was washed with ultra-pure water to remove uncured resist portions not exposed to ultraviolet radiation so as to form a resist pattern.

Right after the above step, the film forming material layer was etched by a shower method using a 0.2 wt % potassium hydroxide aqueous solution (25° C.) as an etching solution for 2 minutes. Thereafter, the film forming material layer was washed with ultra-pure water and dried. Thereby, a film forming material layer pattern consisting of material layer remaining portions and material layer removed portions was formed.

(7) Baking of Film Forming Material Layer

The glass substrate having the film forming material layer pattern formed thereon was baked in a kiln at 600° C. for 30 minutes. Thereby, electrodes were formed on the surface of the glass substrate.

When the section of each of the electrodes was observed through a scanning electron microscope to measure the width at the bottom and height of the section, the width at the bottom was 50 $\mu$m±2 $\mu$m and the height was 10 $\mu$m±1 $\mu$m. Thus, the dimensional accuracy was very high.

The composition of the present invention provides the following effects:

(1) it can suitably form a constituent element (for example, a barrier, electrode, resistor, dielectric layer, phosphor, color filter or black matrix) of a PDP;

(2) it can suitably form a glass sintered body having high light transmittance (for example, a dielectric layer or barrier constituting a PDP);

(3) it can produce a transfer film comprising a film forming material layer having excellent flexibility; and (4) it can produce a transfer film comprising a film forming material layer having excellent transferability of a film forming material layer (heat adhesion to a substrate).

The transfer film of the present invention provides the following effects:

(1) it can form a constituent element (especially a dielectric layer) of a PDP efficiently;

(2) it comprises a film forming material layer having excellent flexibility and is free from flex cracking on the surface of the film forming material layer;
(3) it has excellent suppleness and can be easily rolled;
(4) it comprises a film forming material layer which exhibits appropriate tackiness and has excellent handling properties; and
(5) it has excellent transferability of the film forming material layer (heat adhesion to a substrate).

The production process of the present invention provides the following effects:
(1) it can form a constituent element (for example, a barrier, electrode, resistor, dielectric layer, phosphor, color filter or black matrix) of a PDP efficiently;
(2) it can form a PDP having the high position accuracy of a constituent element efficiently;
(3) it can form a dielectric layer having large thickness efficiently;
(4) it can form a dielectric layer required for a large-sized panel efficiently; and
(5) it can produce a PDP comprising a dielectric layer having excellent uniformity and surface flatness efficiently.

What is claimed is:

1. A plasma display panel production process, comprising:
transferring a film forming material layer of a transfer film to a surface of a substrate, thereby obtaining a transferred film forming material layer on said substrate; and
baking the transferred film forming material layer to form an dielectric layer on the substrate;
wherein said transfer film comprises a base film and said film forming material layer formed of an inorganic particle-containing composition on the base film;
wherein said inorganic particle-containing composition comprises
(A) an inorganic particle;
(B) a binder resin; and
(C) at least one plasticizer selected from the group consisting of a compound represented by formula (1):

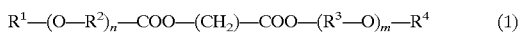

wherein $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10,
and compounds represented by the following formula (2):

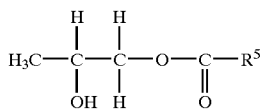

wherein $R^5$ is an alkyl group having 1 to 30 carbon atoms or alkenyl group.

2. A plasma display panel production process, comprising:
transferring a film forming material layer formed of an inorganic particle-containing composition to a surface of a substrate, thereby obtaining a transferred film forming material layer on said substrate;
forming a resist film on the transferred film forming material layer;
exposing the resist film to form a resist pattern latent image;
developing the resist film to form a resist pattern;
etching the film forming material layer to form a pattern layer corresponding to the resist pattern; and
baking the pattern layer to form a constituent element selected from the group consisting of a barrier, an electrode, a resistor, a dielectric layer, phosphor, a color filter and a black matrix;
wherein said inorganic particle-containing composition comprises
(A) an inorganic particle;
(B) a binder resin; and
(C) at least one plasticizer selected from the group consisting of a compound represented by formula (1):

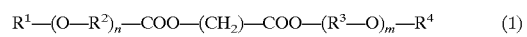

wherein $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10,
and compounds represented by the following formula (2):

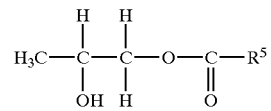

wherein $R^5$ is an alkyl group having 1 to 30 carbon atoms or alkenyl group.

3. A plasma display panel production process, comprising:
transferring a film forming material layer formed of inorganic particle-containing composition to a surface of a substrate;
forming a resist film on the transferred film forming material layer;
exposing the resist film to form a resist pattern latent image;
developing the resist film to form a resist pattern;
etching the film forming material layer to form a pattern layer corresponding to the resist pattern; and
baking the pattern layer to form electrodes;
wherein said inorganic particle-containing composition comprises
(A) an inorganic particle;
(B) a binder resin; and
(C) at least one plasticizer selected from the group consisting of a compound represented by formula (1):

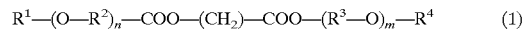

wherein $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10, and compounds represented by the following formula (2):

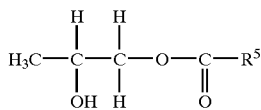

wherein $R^5$ is an alkyl group having 1 to 30 carbon atoms or alkenyl group;

wherein the inorganic particle (A) is at least one electrically co-aductive particle pa selected from the group consisting of Ag, Au, Al, Ni, Ag—Pd alloy, Cu and Cr.

4. A plasma display panel production process, comprising:

forming a laminate film consisting of a resist film and a film forming material layer comprising an inorganic particle-containing composition on a base film, said resist film being formed on said base film and said film forming material layer being formed on said resist film;

transferring the laminate film formed on the base film to the surface of a substrate;

exposing the resist film constituting the laminate film to form a resist pattern latent image;

developing the resist film to form a resist pattern;

etching the film forming material layer to form a pattern layer corresponding to the resist pattern; and baking the pattern layer to form a constituent element selected from the group consisting of a barrier, electrode, resistor, dielectric layer, phosphor, color filter and black matrix;

wherein said inorganic particle-containing composition comprises (A) an inorganic particle;

(B) a binder resin; and (C) at least one plasticizer selected from the group consisting of a compound represented by formula (1):

$$R^1-(O-R^2)_n-COO-(CH_2)-COO-(R^3-O)_m-R^4 \quad (1)$$

wherein $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10, and compounds represented by the following formula (2):

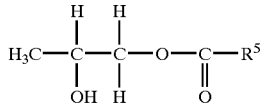

wherein $R^5$ is an alkyl group having 1 to 30 carbon atoms or alkenyl group.

5. A plasma display panel production process, comprising:

forming a laminate film consisting of a resist film and a film forming material layer comprising an inorganic particle-containing composition on a base film, said resist film being formed on said base film and said film forming material layer being formed on said resist film;

transferring the laminate film formed on the base film to the surface of a substrate;

exposing the resist film constituting the laminate film to form a resist pattern latent image;

developing the resist film to form a resist pattern;

etching the film forming material layer to form a pattern layer corresponding to the resist pattern; and baking the pattern layer to form electrodes;

wherein said inorganic particle-containing composition comprises (A) an inorganic particle;

(B) a binder resin; and (C) at least one plasticizer selected from the group consisting of a compound represented by formula (1):

$$R^1-(O-R^2)_n-COO-(CH_2)-COO-(R^3-O)_m-R^4 \quad (1)$$

wherein $R^1$ and $R^4$ are the same or different alkyl groups having 1 to 30 carbon atoms or alkenyl groups, $R^2$ and $R^3$ are the same or different alkylene groups having 1 to 30 carbon atoms or alkenylene groups, m is an integer of 0 to 5, and n is an integer of 1 to 10, and compounds represented by the following formula (2):

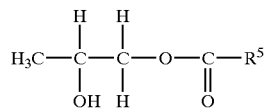

wherein $R^5$ is an alkyl group having 1 to 30 carbon atoms or alkenyl group;

wherein the inorganic particle (A) is at least one electrically co-aductive particle pa selected from the group consisting of Ag, Au, Al, Ni, Ag—Pd alloy, Cu and Cr.

6. The process according to claim 4, wherein the laminate film is transferred to said surface of said substrate so that the film forming material layer is in contact with said surface of said substrate.

7. The process according to claim 5, wherein the laminate film is transferred to said surface of said substrate so that the film forming material layer is in contact with said surface of said substrate.

* * * * *